United States Patent [19]
Fukushima

[11] Patent Number: 5,896,201
[45] Date of Patent: Apr. 20, 1999

[54] OPTICAL DEVICE FOR WAVELENGTH MONITORING AND WAVELENGTH CONTROL

[75] Inventor: Nobuhiro Fukushima, Kawasaki, Japan

[73] Assignee: Fujitsu Limited, Kawasaki, Japan

[21] Appl. No.: 09/033,241

[22] Filed: Mar. 3, 1998

[30] Foreign Application Priority Data

Oct. 14, 1997 [JP] Japan .................... 9-280401

[51] Int. Cl.$^6$ ............................ G01B 11/00
[52] U.S. Cl. ................ 356/394; 356/445; 356/435; 356/309
[58] Field of Search ................. 356/445, 435, 356/309, 10, 255, 394

[56] References Cited

U.S. PATENT DOCUMENTS

| | | | |
|---|---|---|---|
| 4,074,939 | 2/1978 | Rabi | 356/206 |
| 4,095,098 | 6/1978 | Looper | 356/435 |

FOREIGN PATENT DOCUMENTS

| | | |
|---|---|---|
| 55-80384 | 6/1980 | Japan . |
| 57-42927 | 3/1982 | Japan . |
| 61-22250 | 7/1986 | Japan . |
| 4-93915 | 3/1992 | Japan . |
| 4-355704 | 12/1992 | Japan . |
| 5-327664 | 12/1993 | Japan . |
| 09043057 | 2/1997 | Japan . |

*Primary Examiner*—Frank G. Font
*Assistant Examiner*—Reginald A. Ratliff
*Attorney, Agent, or Firm*—Staas & Halsey

[57] ABSTRACT

An optical device for wavelength monitoring and wavelength control. The optical device has an optical element having a first surface and a second surface not parallel to each other. The optical element separates a light beam supplied to the first surface into a first beam reflected on the first surface, a second beam passed through the first surface, reflected on the second surface, and passed through the first surface again, and a third beam passed through the first surface and the second surface in this order. An optical filter is provided so as to transmit the first and second beams. The optical filter has wavelength characteristics different according to an incidence angle. The first and second beams passed through the optical filter are supplied to first and second photodetectors, respectively. On the basis of such a difference in wavelength characteristic, the wavelength of the light beam can be monitored according to outputs from the first and second photodetectors.

20 Claims, 6 Drawing Sheets

OPTICAL DEVICE FOR WAVELENGTH MONITORING AND WAVELENGTH CONTROL

BACKGROUND OF THE INVENTION

1. Field of the Invention

The present invention relates generally to monitoring of the wavelength of an optical signal, and more particularly to an optical device for wavelength monitoring and wavelength control.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, an optical amplifier for directly amplifying signal light has been developed.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

In operating the system adopting WDM, the wavelength of each optical signal is monitored to maintain the wavelength locations of the WDM signal light constant. On the basis of the result of the wavelength monitoring, the wavelength of each optical signal is supervised or controlled. Also in a system using a single channel of optical signal, the wavelength of the optical signal is monitored for the purpose of suppressing a chromatic dispersion occurring in an optical fiber transmission line to an allowable small value, for example.

As a device for wavelength monitoring, an optical wavelength detector described in Japanese Utility Model Publication No. 61-22250, for example, is known. This optical wavelength detector includes a beam splitter for extracting first and second branch light beams from a main optical path, a low-pass filter and a high-pass filter for inputting the first and second branch light beams, respectively, first and second photodetectors for receiving output light beams from the low-pass filter and the high-pass filter, respectively, and a differential amplifier for comparing outputs from the first and second photodetectors. By setting the wavelength characteristics of transmittances of the low-pass filter and the high-pass filter so that the transmittances are changed in opposite directions with a wavelength change in the vicinity of a given wavelength, the wavelength is reflected by an output from the differential amplifier, thereby allowing wavelength monitoring.

In the above-mentioned optical wavelength detector in the prior art, two optical filters (the low-pass filter and the high-pass filter) having different wavelength characteristics are required, so that there arises a problem such that the number of parts is increased and the configuration tends to become complicated.

SUMMARY OF THE INVENTION

It is therefore an object of the present invention to provide an optical device for wavelength monitoring and wavelength control which has a reduced number of parts and a simple configuration.

Other objects of the present invention will become apparent from the following description.

In accordance with a first aspect of the present invention, there is provided an optical device for wavelength monitoring and wavelength control. The optical device includes an optical element having a first surface and a second surface not parallel to each other. The optical element separates a light beam supplied to the first surface into a first beam reflected on the first surface, a second beam passed through the first surface, reflected on the second surface, and passed through the first surface again, and a third beam passed through the first surface and the second surface in this order. An optical filter is provided so as to transmit the first and second beams. The optical filter has wavelength characteristics different according to an incidence angle. The first and second beams passed through the optical filter are supplied to first and second photodetectors, respectively.

Since the first surface and the second surface of the optical element are not parallel to each other, the first and second beams are also not parallel to each other. Accordingly, the incidence angle of the first beam to the optical filter is different from the incidence angle of the second beam to the optical filter. Since the optical filter has wavelength characteristics different according to an incidence angle, the wavelength characteristic of the optical filter for the first beam is different from the wavelength characteristic of the optical filter for the second beam. On the basis of such a difference in wavelength characteristic, the wavelength of the light beam can be monitored according to outputs from the first and second photodetectors.

For example, the wavelength characteristic of the optical filter for one of the first and second beams gives a transmittance decreasing with an increase in wavelength in a given wavelength range, and the wavelength characteristic of the optical filter for the other of the first and second beams gives a transmittance increasing with an increase in wavelength in the given wavelength range. In this case, the wavelength of the light beam is reflected by the difference or ratio between outputs from the first and second photodetectors. Accordingly, by using a differential amplifier for comparing the outputs from the first and second photodetectors in this case, the wavelength of the light beam can be easily monitored. Such two different wavelength characteristics of the optical filter can be obtained by using a band-pass filter, for example, as the optical filter. In this case, the center wavelength in a pass band of the band-pass filter changes according to an incidence angle to the optical filter.

Preferably, the first and second photodetectors are formed on a common semiconductor substrate or accommodated in a common package. Accordingly, the characteristics of the first and second photodetectors are changed similarly with environmental changes or the like, so that a monitoring accuracy is improved especially in the case of obtaining a monitored value of wavelength according to the outputs from the first and second photodetectors as in the present invention.

By additionally providing a light source for outputting the light beam, it is possible to provide an optical transmitter to which the wavelength control according to the present invention is applied. The light source is controlled according to the outputs from the first and second photodetectors, thereby maintaining the wavelength of the light beam constant.

For example, the light source is a laser diode. In this case, the temperature of the laser diode is controlled according to the outputs from the first and second photodetectors. In general, the oscillation wavelength of the laser diode is increased with an increase in temperature and decreased with a decrease in temperature. Accordingly, by configuring a simple feedback loop, the wavelength of the light beam can be easily maintained constant.

In accordance with a second aspect of the present invention, there is provided an optical device for wavelength monitoring and wavelength control. The optical device includes an optical element having a first surface and a second surface parallel to each other. The optical element separates a light beam supplied to the first surface into a first beam reflected on the first surface, a second beam passed through the first surface, reflected on the second surface, and passed through the first surface again, and a third beam passed through the first surface and the second surface in this order. An optical filter is provided so as to transmit the first and second beams. The optical filter has wavelength characteristics different according to an incidence position. The first and second beams passed through the optical filter are supplied to first and second photodetectors, respectively.

Since the first surface and the second surface of the optical element are parallel to each other, the first and second beams are also parallel to each other and are present at spatially different positions. Accordingly, the incidence position of the first beam to the optical filter is different from the incidence position of the second beam to the optical filter. Since the optical filter has wavelength characteristics different according to an incidence position, the wavelength characteristic of the optical filter for the first beam is different from the wavelength characteristic of the optical filter for the second beam. On the basis of such a difference in wavelength characteristic, the wavelength of the light beam can be monitored according to outputs from the first and second photodetectors.

For example, the wavelength characteristic of the optical filter for one of the first and second beams gives a transmittance decreasing with an increase in wavelength in a given wavelength range, and the wavelength characteristic of the optical filter for the other of the first and second beams gives a transmittance increasing with an increase in wavelength in the given wavelength range. In this case, the wavelength of the light beam is reflected by the difference or ratio between outputs from the first and second photodetectors. Accordingly, by using a differential amplifier for comparing the outputs from the first and second photodetectors in this case, the wavelength of the light beam can be easily monitored. Such two different wavelength characteristics of the optical filter can be obtained by using a band-pass filter comprising a dielectric multilayer film each layer of which has a thickness changed according to a position, for example, as the optical filter. In this case, the center wavelength in a pass band of the band-pass filter changes according to an incidence position to the optical filter.

Preferably, the first and second photodetectors are formed on a common semiconductor substrate or accommodated in a common package. Accordingly, the characteristics of the first and second photodetectors are changed similarly with environmental changes or the like, so that a monitoring accuracy is improved especially in the case of obtaining a monitored value of wavelength according to the outputs from the first and second photodetectors as in the present invention.

By additionally providing a light source for outputting the light beam, it is possible to provide an optical transmitter to which the wavelength control according to the present invention is applied. The light source is controlled according to the outputs from the first and second photodetectors, thereby maintaining the wavelength of the light beam constant.

For example, the light source is a laser diode. In this case, the temperature of the laser diode is controlled according to the outputs from the first and second photodetectors. In general, the oscillation wavelength of the laser diode is increased with an increase in temperature and decreased with a decrease in temperature. Accordingly, by configuring a simple feedback loop, the wavelength of the light beam can be easily maintained constant.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the attached drawings.

Figure 1:
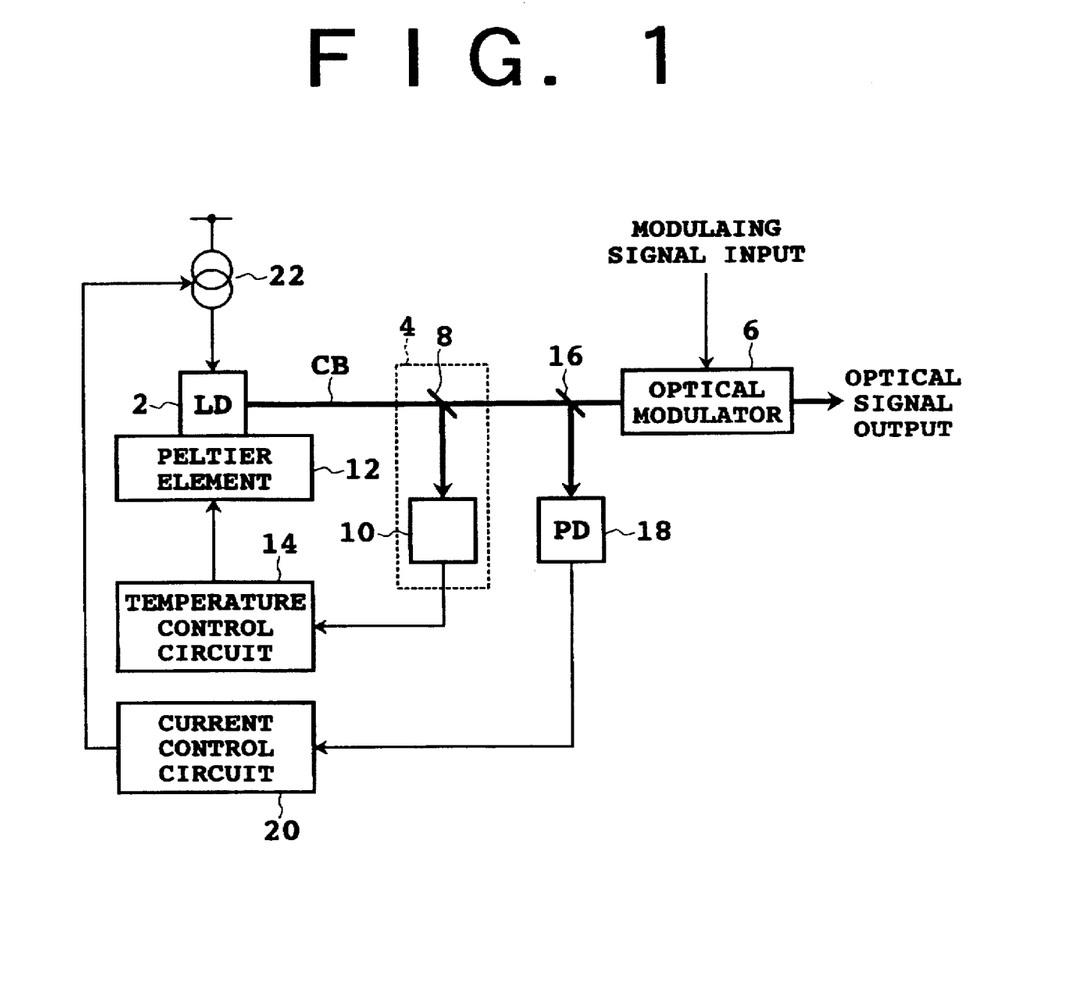
FIG. 1 is a block diagram showing a preferred embodiment of an optical transmitter according to the present invention.

Referring to FIG. 1, there is shown a preferred embodiment of an optical transmitter as an example of the optical device according to the present invention. This optical transmitter includes a laser diode (LD) 2 as a light source for outputting a carrier beam CB, a wavelength monitor 4 for the carrier beam CB, and an optical modulator 6 for modulating the carrier beam CB according to a modulating signal supplied thereto to output an optical signal. In this preferred embodiment, the carrier beam CB is continuous wave (CW) light. The wavelength monitor 4 has an optical coupler function 8 for extracting a branch beam for wavelength monitoring from the carrier beam CB received, and a monitoring function 10 for receiving the branch beam to output an electrical signal according to the wavelength of the branch beam. The laser diode 2 is mounted on a Peltier element 12 for cooling. The cooling ability of the Peltier element 12 can be adjusted according to a current to be supplied to the Peltier element 12. Accordingly, the temperature of the laser diode 2 can be maintained substantially constant by balancing heat radiation from the laser diode 2 and the cooling ability of the Peltier element 12.

Particularly in this preferred embodiment, a temperature control circuit 14 receives the electrical signal output from the wavelength monitor 4 to control the current to be supplied to the Peltier element 12 so that the wavelength of the carrier beam CB is maintained constant. Usually, the higher the temperature of the laser diode 2, the longer the wavelength of the carrier beam CB, whereas the lower the temperature of the laser diode 2, the shorter the wavelength of the carrier beam CB. Accordingly, when the wavelength obtained by the wavelength monitor 4 becomes longer, the cooling ability of the Peltier element 12 is increased, whereas when the wavelength obtained by the wavelength monitor 4 becomes shorter, the cooling ability of the Peltier element 12 is decreased. Such feedback control allows the wavelength of the carrier beam CB to be maintained substantially constant.

The carrier beam CB passed through the wavelength monitor 4 is supplied through an optical coupler 16 to the optical modulator 6. The optical coupler 16 extracts a branch beam for monitoring of the optical power of the carrier beam CB and supplies the branch beam to a photodetector (PD) 18. The photodetector 18 receives the branch beam and outputs an electrical signal having a level corresponding to the optical power of the branch beam received. The output signal from the photodetector 18 is supplied to a current control circuit 20. The current control circuit 20 controls a drive current to be supplied from a current source 22 to the laser diode 2. Accordingly, the optical power of the carrier beam CB to be supplied to the optical modulator 6 can be maintained substantially constant to thereby maintain constant the amplitude of the optical signal to be output from the optical modulator 6.

According to this preferred embodiment, even when the wavelength and/or the optical power of the carrier beam CB to be output from the laser diode 2 are/is changed because of its aged deterioration or the like, the wavelength and the amplitude of the optical signal to be output from the optical modulator 6 can be maintained constant by using a feedback loop for wavelength control (including the wavelength monitor 4, the temperature control circuit 14, and the Peltier element 12) and a feedback loop for optical power control (including the optical coupler 16, the photodetector 18, and the current control circuit 20). Accordingly, high-density WDM can be achieved by applying this optical transmitter to each channel in a transmitting station using WDM.

In this preferred embodiment, the temperature of the laser diode 2 is controlled to maintain the wavelength constant, because the drive current for the laser diode 2 is used as a subject of control for maintaining the optical power constant. Accordingly, in the case that the feedback loop for maintaining the optical power constant is not required or in the case that an optical attenuator or an optical amplifier is additionally provided to maintain the optical power constant, the wavelength may be controlled according to the drive current for the laser diode 2.

While the optical modulator 6 is provided independently of the laser diode 2 to obtain an optical signal according to a modulating signal in this preferred embodiment, the laser diode 2 may be directly modulated according to a modulating signal input thereto without using the optical modulator 6. Alternatively, the optical modulator 6 may be provided immediately downstream of the laser diode 2, and the wavelength monitor 4 and the optical coupler 16 may be provided downstream of the optical modulator 6 to perform feedback control for the wavelength and the optical power of an optical signal output from the optical modulator 6.

Figure 2:
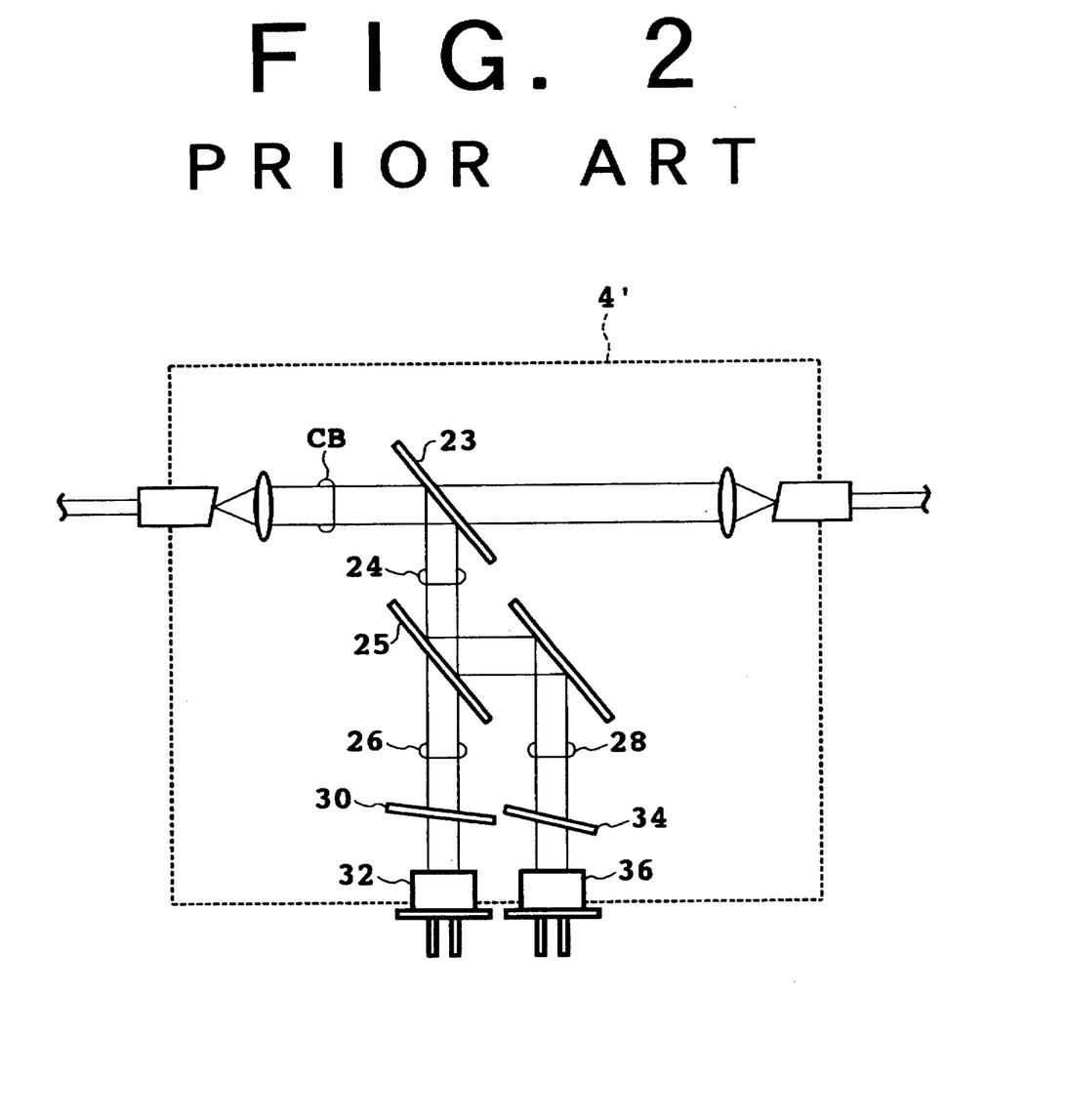
FIG. 2 is a view showing a wavelength monitor in the prior art.

Referring to FIG. 2, there is shown a conventional wavelength monitor 4' that can be used instead of the wavelength monitor 4 shown in FIG. 1. The configuration and the principles of operation of the wavelength monitor 4' will now be described because the description of the prior art is considered to be useful for demonstration of the priority of the wavelength monitor 4 according to the present invention. A beam 24 extracted from the carrier beam CB by an optical coupler 23 is separated into beams 26 and 28 by an optical coupler 25. The beam 26 is passed through a low-pass filter 30 to enter a photodetector 32, and the beam 28 is passed through a high-pass filter 34 to enter a photodetector 36.

Figure 3:
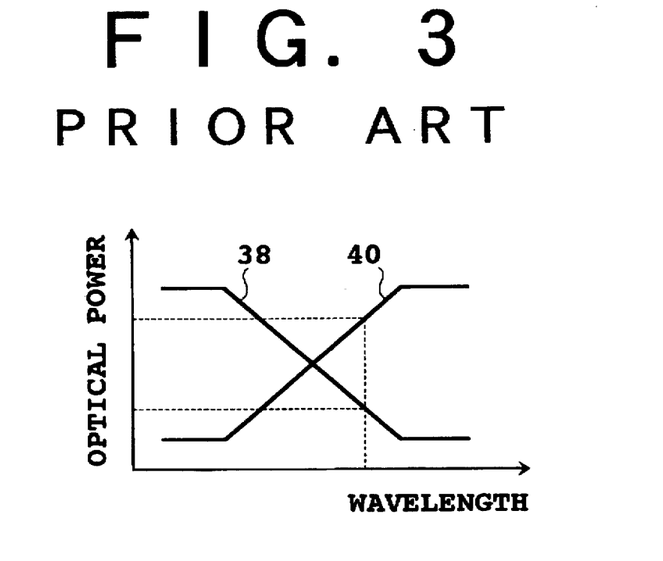
FIG. 3 is a graph for illustrating the principles of operation of the wavelength monitor shown in FIG. 2.

FIG. 3 is a graph for illustrating the principles of operation of the wavelength monitor 4' shown in FIG. 2. The low-pass filter 30 and the high-pass filter 34 have characteristics shown by reference numerals 38 and 40 in FIG. 3, respectively. That is, the optical powers of the beams 26 and 28 passing through the low-pass filter 30 and the high-pass filter 34 change in opposite directions with a wavelength change in the vicinity of a given wavelength (a wavelength assumed as the wavelength of the carrier beam CB). Accordingly, the wavelength of the carrier beam CB can be monitored according to the difference or ratio between the transmitted light powers obtained by the photodetectors 32 and 36.

Figure 4:
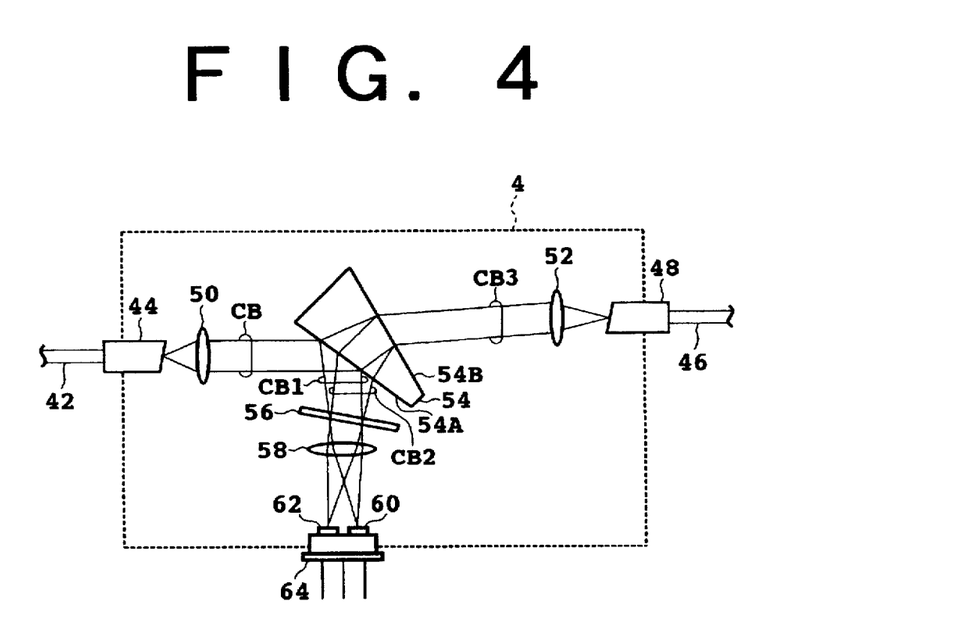
FIG. 4 is a view showing a preferred embodiment of a wavelength monitor according to the present invention.

Referring to FIG. 4, there is shown a preferred embodiment of the wavelength monitor 4 as the optical device for wavelength monitoring and wavelength control according to the present invention. The input port of the wavelength monitor 4 is provided by an optical fiber 42 and a ferrule 44 in which an end portion of the optical fiber 42 is inserted and fixed in such a manner that the end face of the optical fiber 42 is exposed. The output port of the wavelength monitor 4 is provided by an optical fiber 46 and a ferrule 48 in which an end portion of the optical fiber 46 is inserted and fixed in such a manner that the end face of the optical fiber 46 is exposed. The optical fiber 42 is optically connected to the laser diode 2 shown in FIG. 1. A lens 50 is provided in opposed relationship to the ferrule 44, so that the carrier beam CB is converted into a substantially parallel beam (collimated beam) by the lens 50. Further, a lens 52 is provided in opposed relationship to the ferrule 48.

The wavelength monitor 4 includes a wedge plate 54 as an optical element for separating the carrier beam CB into three beams CB1, CB2, and CB3. The wedge plate 54 is formed of a substantially transparent material for the carrier beam CB, such as glass. The wedge plate 54 has a first surface 54A and a second surface 54B that are both flat and not parallel to each other.

The carrier beam CB collimated by the lens 50 is supplied to the first surface 54A of the wedge plate 54. The wedge plate 54 separates the supplied carrier beam CB into the beam CB1 reflected on the first surface 54A, the beam CB2 passed through the first surface 54A, reflected on the second surface 54B, and passed through the first surface 54A again, and the beam CB3 passed through the first surface 54A and the second surface 54B in this order. The beam CB3 is converged by the lens 52 to enter the optical fiber 46 from its end face. The beam CB1 is passed through a transmission type optical filter 56 and converged by a lens 58 to enter a light receiving surface of a photodetector 60. The beam CB2 is passed through the optical filter 56 and converged by the lens 58 to enter a light receiving surface of a photodetector 62. The photodetectors 60 and 62 are photodiodes, for example. In this preferred embodiment, these photodiodes are housed in a common package 64 (a housing thereof is not shown).

Figure 5:
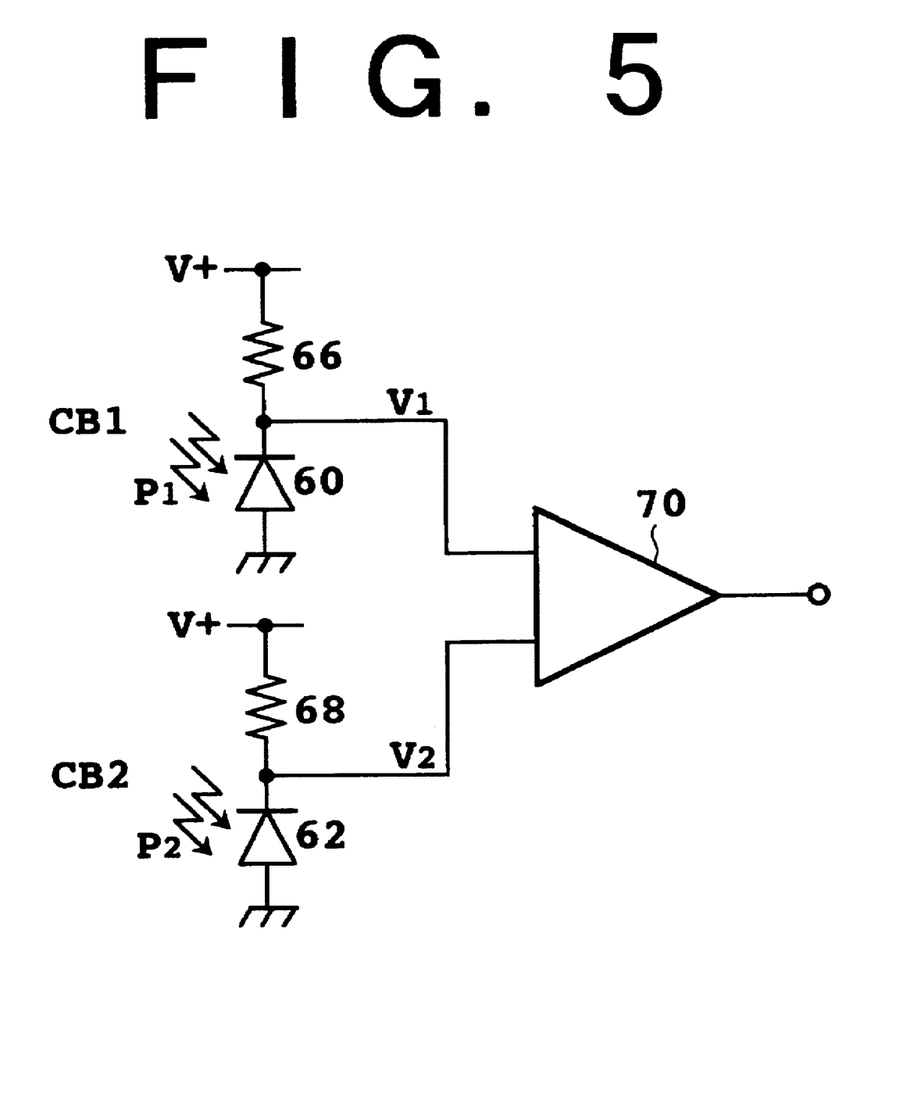
FIG. 5 is a circuit diagram of the wavelength monitor shown in FIG. 4.

FIG. 5 is a circuit diagram of the wavelength monitor 4 shown in FIG. 4. A reverse bias voltage is applied to each of the photodetectors (photodiodes) 60 and 62. The anode of the photodetector 60 is grounded, and the cathode of the photodetector 60 is connected through a resistor 66 to a plus power supply line. The anode of the photodetector 62 is grounded, and the cathode of the photodetector 62 is connected through a resistor 68 to a plus power supply line. When the beam CB1 passed through the optical filter 56 enters the photodetector 60, a photocurrent corresponding to the optical power of the beam CB1 flows in the photodetector 60. Accordingly, the optical power of the beam CB1 is reflected by a potential at the cathode of the photodetector 60. Similarly, when the beam CB2 passed through the optical filter 56 enters the photodetector 62, a photocurrent corresponding to the optical power of the beam CB2 flows in the photodetector 62. Accordingly, the optical power of the beam CB2 is reflected by a potential at the cathode of the photodetector 62. In this preferred embodiment, a differential amplifier 70 is additionally used to compare the cathode potential of the photodetector 60 and the cathode potential of the photodetector 62.

Figure 6:
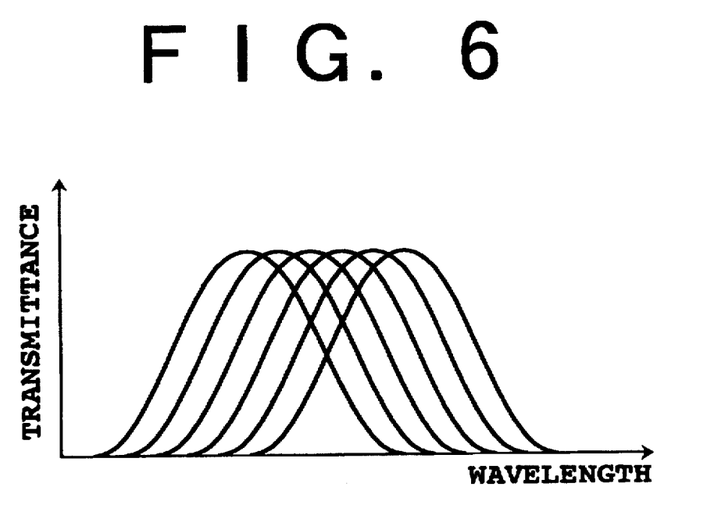
FIG. 6 is a graph showing an incidence angle dependence of wavelength characteristic of an optical filter shown in FIG. 4.

Referring to FIG. 6, there is shown a wavelength characteristic of the optical filter 56 shown in FIG. 4. The wavelength characteristic herein means a characteristic representing the relation between wavelength and transmittance (or transmitted light power) in a transmission type optical filter. The optical filter 56 has wavelength characteristics different according to an incidence angle. More specifically, the optical filter 56 is a band-pass filter, and it is manufactured, for example, by laminating a dielectric multilayer film on a glass plate. The dielectric multilayer film is obtained by alternately laminating $TiO_2$ layers each having a relatively high refractive index and $SiO_2$ layers each having a relatively low refractive index. As shown in FIG. 6, a wavelength giving a maximum transmittance (or a center wavelength in a pass band) changes along the wavelength axis with a change in incidence angle to the optical filter 56. In FIG. 6, wavelength characteristics corresponding to six different incidence angles are shown, and the wavelength giving the maximum transmittance decreases with an increase in incidence angle.

In the preferred embodiment shown in FIG. 4, the first surface 54A and the second surface 54B of the wedge plate 54 are not parallel to each other, so that the beams CB1 and CB2 are also not parallel to each other. Accordingly, by suitably setting the angle formed between the first surface 54A and the second surface 54B and the positions of the wedge plate 54 and the optical filter 56, for example, the optical filter 56 can obtain different wavelength characteristics for the beams CB1 and CB2.

Figure 7:
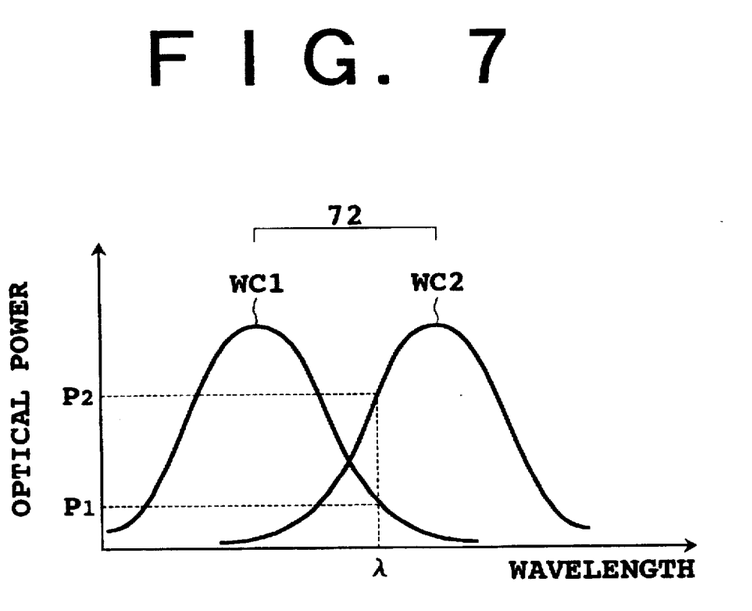
FIG. 7 is a graph for illustrating the principles of operation of the wavelength monitor shown in FIG. 4.

The principles of operation of the wavelength monitor 4 shown in FIG. 4 will now be described with reference to FIG. 7. In FIG. 7, the vertical axis represents optical power of transmitted light through the optical filter 56, and the horizontal axis represents wavelength.

A wavelength characteristic as shown by WC1 is obtained for the beam CB1, and a wavelength characteristic WC2 different from the wavelength characteristic WC1 is obtained for the beam CB2. In a range 72 of given wavelengths (including a wavelength assumed as the wavelength of the carrier beam CB), the wavelength characteristic WC1 gives a transmittance (transmitted light power) decreasing with an increase in wavelength, and the wavelength characteristic WC2 gives a transmittance (transmitted light power) increasing with an increase in wavelength. Accordingly, if the temperature control circuit 14 performs control so that a cross point between the wavelength characteristics WC1 and WC2 is obtained, i.e., the transmitted light powers of the beams CB1 and CB2 for the optical filter 56 are equal to each other in the wavelength range 72, the wavelength of the carrier beam CB is maintained at a wavelength giving the above-mentioned cross point.

In this preferred embodiment, the differential amplifier 70 as shown in FIG. 5 is used, so that more general wavelength monitoring and wavelength control can be achieved. This will be described below more specifically.

For example, it is assumed that the transmitted light power of the beam CB1 for the optical filter 56 is $P_1$ and the transmitted light power of the beam CB2 for the optical filter 56 is $P_2$ at the wavelength λ of the carrier beam CB. Further, it is assumed that the voltage levels of outputs from the photodetectors 60 and 62 respectively corresponding to the powers $P_1$ and $P_2$ are $V_1$ and $V_2$, respectively. In this case, the wavelength λ and the difference or ratio between the transmitted light powers $P_1$ and $P_2$ are in a one-to-one correspondence to each other in the wavelength range 72, so that the wavelength is reflected by the output level of the differential amplifier 70. Accordingly, by using the output signal from the differential amplifier 70 to operate the temperature control circuit 14 shown in FIG. 1, the wavelength of the carrier beam CB can be easily maintained constant.

The reason why a band-pass filter is used as the optical filter 56 in this preferred embodiment is that its wavelength characteristic shifts along the wavelength axis according to an incidence angle and by use of this fact two wavelength characteristics crossing each other in a given wavelength range can be obtained. In association therewith, the additional use of the differential amplifier 70 can facilitate wavelength monitoring and wavelength control.

In this preferred embodiment, the carrier beam CB is converted into a parallel beam by using the lens 50, so that the beams CB1 and CB2 also become parallel beams. As a result, the incidence angles of light rays forming the beam CB1 to the optical filter 56 are equal, and the incidence angles of light rays forming the beam CB2 to the optical filter 56 are also equal. Accordingly, the wavelength characteristic corresponding to each beam is prevented from becoming dull.

In this preferred embodiment, the common lens 58 operating on both the beams CB1 and CB2 passed through the optical filter 56 is provided between the optical filter 56 and the photodetectors 60 and 62. Accordingly, even when the light receiving area of each photodetector is small, the coupling efficiency of the photodetectors 60 and 62 can be improved to thereby improve the accuracy of wavelength monitoring.

The reflectance of each of the first and second surfaces 54A and 54B of the wedge plate 54 is about 4%, for example. In this case, the power of the beam CB1 is about 4% of the power of the carrier beam CB, and the power of the beam CB2 is about 3.7 (4×0.96×0.96) % of the power of the carrier beam CB. Thus, the powers of the beams CB1 and CB2 are almost equal, so that the maximum transmitted light power in the wavelength characteristic WC1 is substantially equal to the maximum transmitted light power in the wavelength characteristic WC2.

In the case that the reflectance of each of the first and second surfaces 54A and 54B of the wedge plate 54 is higher than the above value, the maximum transmitted light power in the wavelength characteristic WC2 becomes lower than the maximum transmitted light power in the wavelength characteristic WC1. Also in this case, however, the point that the wavelength and the ratio or difference between the transmitted light powers are in a one-to-one correspondence to each other remains unchanged, so that no problem arises. To correct such an imbalance between the two wavelength characteristics obtained, an offset voltage may be applied to any one of the photodetectors 60 and 62.

In this preferred embodiment, the photodetectors 60 and 62 are accommodated in the common package 64. Accordingly, variations in the wavelength characteristics WC1 and WC2 due to temperature changes show similar behavior, so that the variations are canceled each other, thereby improving the accuracies of wavelength monitoring and wavelength control.

In this preferred embodiment, the two wavelength characteristics WC1 and WC2 are obtained by the single optical filter 56. Accordingly, the number of optical filters can be reduced as compared with the prior art shown in FIG. 2. Further, since the wedge plate 54 corresponding to the optical coupler function 8 shown in FIG. 1 is used, the beams CB1 and CB2 can be extracted directly from the carrier beam CB, thereby eliminating the optical coupler 25 in the prior art shown in FIG. 2. Thus, it is possible to provide an optical device having a reduced number of parts and a simple configuration according to this preferred embodiment.

Figure 8:
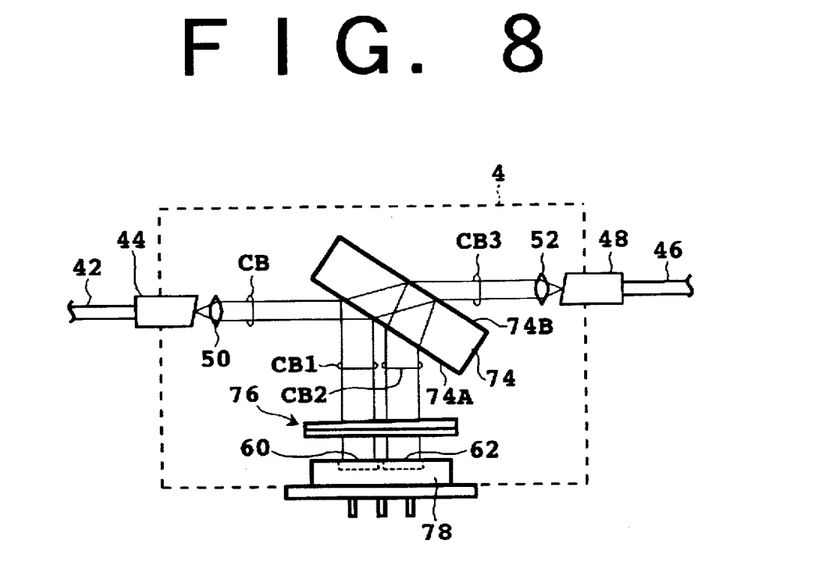
FIG. 8 is a view showing another preferred embodiment of the wavelength monitor according to the present invention.

Referring to FIG. 8, there is shown another preferred embodiment of the wavelength monitor 4 as the optical device for wavelength monitoring and wavelength control according to the present invention. This preferred embodiment employs a plane plate 74 formed of a transparent material such as glass as the optical element for separating the carrier beam CB into three beams CB1, CB2, and CB3. Further, an optical filter 76 specifically designed is used, and the photodetectors 60 and 62 are formed on a common substrate (e.g., a semiconductor substrate) 78 in an integral fashion. Although the lens 58 shown in FIG. 4 is omitted in this preferred embodiment, the lens 58 may be provided to improve a monitoring accuracy.

The plane plate 74 has a first surface 74A and a second surface 74B parallel to each other. The carrier beam CB collimated by the lens 50 is supplied to the first surface 74A. The plane plate 74 separates the supplied carrier beam CB into the beam CB1 reflected on the first surface 74A, the beam CB2 passed through the first surface 74A, reflected on the second surface 74B, and passed through the first surface 74A again, and the beam CB3 passed through the first surface 74A and the second surface 74B in this order. The beam CB3 is converged by the lens 52 to enter the optical fiber 46 from its end face. The beams CB1 and CB2 are passed through the optical filter 76 and supplied to the photodetectors 60 and 62, respectively.

Figure 9:
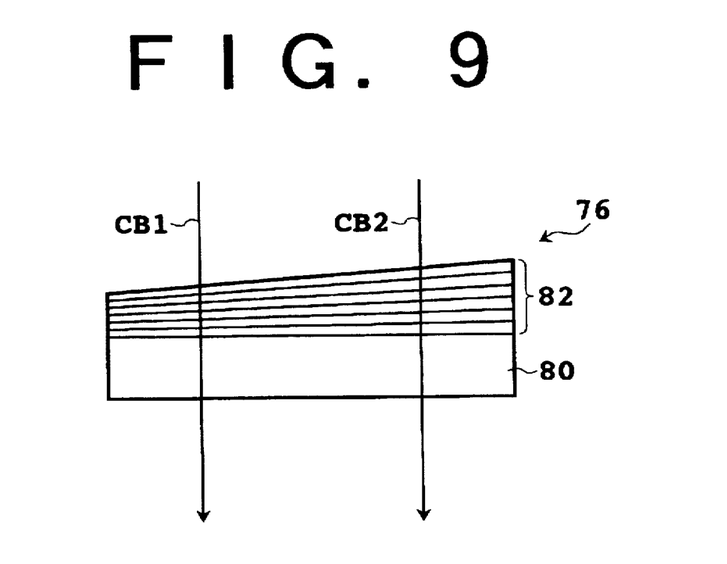
FIG. 9 is a view showing a sectional configuration of an optical filter shown in FIG. 8.

Referring to FIG. 9, there is shown a sectional configuration of the optical filter 76 shown in FIG. 8. The optical filter 76 is composed of a transparent plane plate 80 of glass or the like and a dielectric multilayer film 82 laminated on the plane plate 80. The dielectric multilayer film 82 is configured, for example, by alternately laminating a plurality of $TiO_2$ layers each having a relatively high refractive index and a plurality of $SiO_2$ layers each having a relatively low refractive index. The thickness of each layer of the dielectric multilayer film 82 is changed from a position where the beam CB1 passes toward a position where the beam CB2 passes. With this configuration, the optical filter 76 has wavelength characteristics different according to an incidence position.

Accordingly, by suitably designing the dielectric multilayer film 82 and setting the passing positions of the beams CB1 and CB2, the wavelength characteristics WC1 and WC2 respectively corresponding to the beams CB1 and CB2 as shown in FIG. 7 can be obtained, thereby making the operation of the wavelength monitor shown in FIG. 8 similar to the operation of the wavelength monitor shown in FIG. 4. The description of the principles of operation and the obtainable advantages of the wavelength monitor shown in FIG. 8 will be omitted herein to avoid repetition.

The thickness of the plane plate 74 defined by the distance between the first surface 74A and the second surface 74B is set so that the beams CB1 and CB2 are not spatially overlapped each other. Accordingly, each wavelength characteristic is prevented from becoming dull, thereby improving the accuracies of wavelength monitoring and wavelength control.

The reason why the optical filter 76 is designed so as to have wavelength characteristics different according to an incidence position in the preferred embodiment shown in FIG. 8 is that the beams CB1 and CB2 are parallel to each other and that the optical filter 76 is therefore intended to give different wavelength characteristics for these parallel beams CB1 and CB2.

The advantages obtained by forming the photodetectors 60 and 62 on the common substrate 78 is substantially similar to the advantages obtained by accommodating the photodetectors 60 and 62 in the common package 64 as shown in FIG. 4. However, the advantages of the preferred embodiment shown in FIG. 8 is greater by the configuration that the photodetectors 60 and 62 are integral with the substrate 78.

In the case that the reflectance and the transmittance depend on polarization in each preferred embodiment mentioned above, there is a possibility that the accuracies of wavelength monitoring and wavelength control may be reduced. To eliminate such a possibility, a polarization maintaining fiber is preferably used as the optical fiber 42 to maintain an always constant polarized condition of the carrier beam CB to be supplied.

As described above, according to the present invention, it is possible to provide an optical device for wavelength monitoring and wavelength control which has a reduced number of parts and a simple configuration.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical device comprising:
    an optical element having a first surface and a second surface not parallel to each other, for separating a light beam supplied to said first surface into a first beam reflected on said first surface, a second beam passed through said first surface, reflected on said second surface, and passed through said first surface again, and a third beam passed through said first surface and said second surface in this order;

an optical filter provided so as to transmit said first and second beams and having wavelength characteristics different according to an incidence angle; and first and second photodetectors for receiving said first and second beams passed through said optical filter, respectively.

2. An optical device according to claim 1, wherein:

said wavelength characteristic of said optical filter for one of said first and second beams gives a transmittance decreasing with an increase in wavelength in a given wavelength range; and said wavelength characteristic of said optical filter for the other of said first and second beams gives a transmittance increasing with an increase in wavelength in said given wavelength range.

3. An optical device according to claim 2, further comprising a differential amplifier for comparing outputs from said first and second photodetectors.

4. An optical device according to claim 1, further comprising:

a first lens for collimating light output from a first optical fiber so that said light beam becomes a parallel beam; and a second lens for converging said third beam to input it into a second optical fiber.

5. An optical device according to claim 1, further comprising a lens provided between said optical filter and said first and second photodetectors, for converging said first and second beams passed through said optical filter to direct them onto light receiving surfaces of said first and second photodetectors, respectively.

6. An optical device according to claim 1, wherein said first and second photodetectors are formed on a common semiconductor substrate or accommodated in a common package.

7. An optical device according to claim 1, further comprising:

a light source for outputting said light beam; and means for controlling said light source according to outputs from said first and second photodetectors so that the wavelength of said light beam is maintained constant.

8. An optical device according to claim 7, wherein:

said light source is a laser diode; and said controlling means controls the temperature of said laser diode.

9. An optical device according to claim 8, further comprising:

means for detecting the power of said third beam; and means for controlling a drive current for said laser diode so that the power detected by said detecting means is maintained constant.

10. An optical device comprising:

an optical element having a first surface and a second surface parallel to each other, for separating a light beam supplied to said first surface into a first beam reflected on said first surface, a second beam passed through said first surface, reflected on said second surface, and passed through said first surface again, and a third beam passed through said first surface and said second surface in this order;

an optical filter provided so as to transmit said first and second beams and having wavelength characteristics different according to an incidence position; and first and second photodetectors for receiving said first and second beams passed through said optical filter, respectively.

11. An optical device according to claim 10, wherein the thickness of said optical element defined by the distance between said first surface and said second surface is set so that said first and second beams are not spatially overlapped each other.

12. An optical device according to claim 10, wherein:

said optical filter comprises a dielectric multilayer film;

the thickness of each layer of said dielectric multilayer film being changed from a position where said first beam passes toward a position where said second beam passes.

13. An optical device according to claim 10, wherein:

said wavelength characteristic of said optical filter for one of said first and second beams gives a transmittance decreasing with an increase in wavelength in a given wavelength range; and said wavelength characteristic of said optical filter for the other of said first and second beams gives a transmittance increasing with an increase in wavelength in said given wavelength range.

14. An optical device according to claim 13, further comprising a differential amplifier for comparing outputs from said first and second photodetectors.

15. An optical device according to claim 10, further comprising:

a first lens for collimating light output from a first optical fiber so that said light beam becomes a parallel beam; and a second lens for converging said third beam to input it into a second optical fiber.

16. An optical device according to claim 10, further comprising a lens provided between said optical filter and said first and second photodetectors, for converging said first and second beams passed through said optical filter to direct them onto light receiving surfaces of said first and second photodetectors, respectively.

17. An optical device according to claim 10, wherein said first and second photodetectors are formed on a common semiconductor substrate or accommodated in a common package.

18. An optical device according to claim 10, further comprising:

a light source for outputting said light beam; and means for controlling said light source according to outputs from said first and second photodetectors so that the wavelength of said light beam is maintained constant.

19. An optical device according to claim 18, wherein:

said light source is a laser diode; and said controlling means controls the temperature of said laser diode.

20. An optical device according to claim 19, further comprising:

means for detecting the power of said third beam; and means for controlling a drive current for said laser diode so that the power detected by said detecting means is maintained constant.

* * * * *